United States Patent Office 3,076,214
Patented Feb. 5, 1963

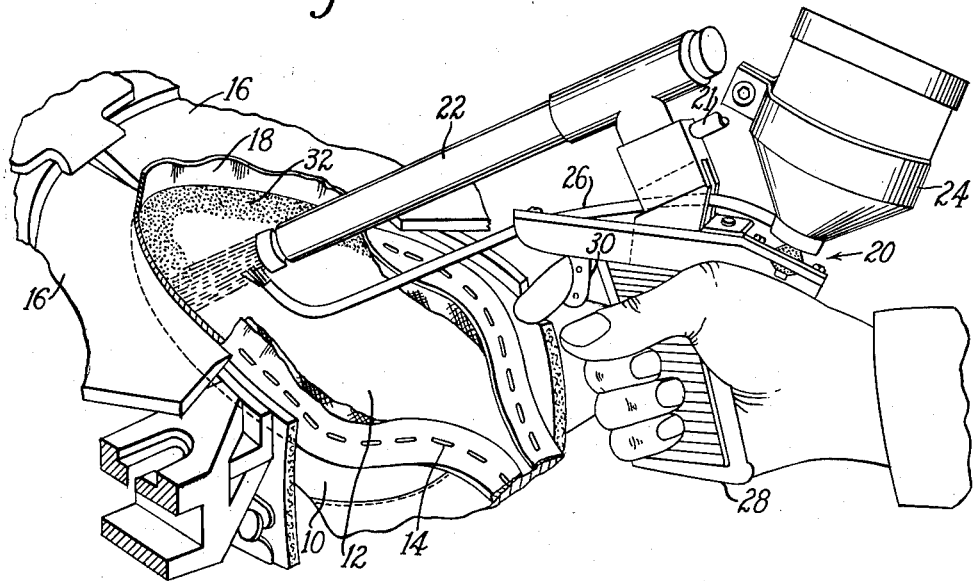
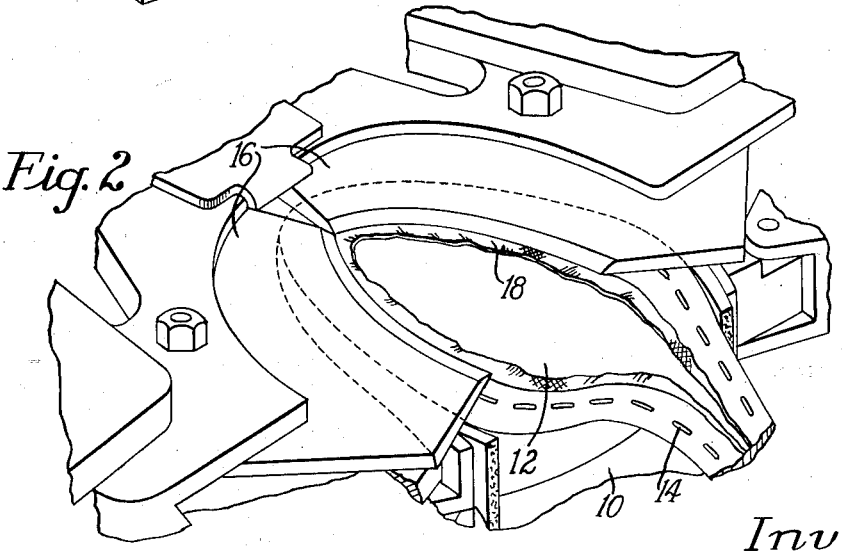

3,076,214
METHODS OF BONDING
Walter H. Wedger, Hamilton, Mass., assignor, by mesne assignments, to United Shoe Machinery Corporation, Flemington, N.J., a corporation of New Jersey
Filed Jan. 31, 1961, Ser. No. 86,131
10 Claims. (Cl. 12—145)

This invention relates to a method of bonding and particularly to an adhesive method of fastening shoe uppers in lasted relation to insoles or other shoe bottom parts.

Thermoplastic adhesive bonding has been applied in many relations. A particular bonding process adapted for the cement lasting of shoe uppers is disclosed in a copending application of Ernest M. Crowell, Serial No. 826,152, filed on July 10, 1959. In that process a high melting point resin having special solidification and crystallization characteristics is melted and deposited as a bead along the portions of an insole to which the lasting margin of a shoe upper is to be secured. While the bead of adhesive is still molten, the lasting margin is laid down on the resin and pressed to spread out the resin bead between the surfaces while the resin is still in amorphous deformable condition capable of forming a bond to a surface. Excellent results are obtained in this process and it has entered into extensive use in shoemaking.

The adhesive having the special characteristics employed in that process has a high cost per pound, and substantial quantities of the resin must be applied in order that the deposited resin may have sufficient sensible heat to keep the cement soft until the lasting is complete and also to insure effective wetting and over-all engagement of the adhesive with the surfaces to be joined. A high melting point is characteristic of adhesive having the strength required and is important also to prevent loosening of the bond in any further processing of the shoe which may involve heat.

It is a bonding method in which object of the present invention to provide an adhesive is applied to give effective wetting and bonding of surfaces in much smaller quantities and with lower heat requirements than in methods previously known. It is a further object to provide a method of bonding with an adhesive forming a union having a superior resistance to weakening or failure in subsequent exposure to high temperatures.

To these ends, and in accordance with the present invention, I have provided a finely divided adhesive composition in which at least two fusible components are maintained in close engagement but spatially distinct, the two components being at least partially miscible in heat softened condition. One of the components may be a tough, usually relatively high melting point resinous material for example, a thermoplastic linear polymer; and the other component is a material more readily reducible by the heat used in application to freely fluid conditions. This second component usually has a relatively low melting point, or softening point, and is at least partially miscible with the first component in heat softened condition so that when a heated mixture is deposited on a surface, the low melting component is effective to improve coalescence of particles of the high melting component and the entry of such component into bonding relation with surfaces. A portion of the second component, because of its fluid condition, may improve the depth of penetration of porous surfaces and/or the wetting of surfaces to improve the character of a bond. For high temperature resistance, it has been found that thermosetting resinous materials are particularly valuable as the second component since the heating converts them to an infusible condition where they reinforce rather than soften the first component.

Bonding of surfaces with thermo plastic adhesives requires that the adhesive be spread in a layer of effective thickness on a surface, that it be brought to bond forming temperature and that the second surface be brought against the adhesive while the adhesive is at bond forming temperature. Heat damage to the adhesive or to the surfaces to be bonded is a serious problem in each of these phases of thermo plastic adhesive bonding.

It is an object of the present invention to reduce the danger of heat damage in thermo plastic adhesive bonding.

To this end and in accordance with a feature of the present invention, heat for application and activation of the adhesive is supplied by introduction of the new adhesive powder into a stream of heated gas. Not only are the particles brought quickly up to temperature, but since the low melting component is in freely fluid condition at such temperatures, it not only wets and adheres to surfaces against which the stream is directed, but it also appears to provide tacky areas which will trap and hold the particles of the high melting component so that a layer of adhesive particles of effective thickness is built up and the particles are not displaced and blown away by the stream of gas. Additionally, where the low melting component is a thermo setting resin, this procedure allows the temperature of the resin to be increased so quickly that the resin is melted without being cured and will give the advantages of a low melting component in coacting with the high melting component, as above described. Also, for the first time the procedure enables deposition without use of solvent of a layer of a mutual solution of a thermosetting and a thermoplastic resin in a heated tacky condition capable of bonding to surfaces. It would not be possible to melt such resins together to form a solution and to spread such a solution on a surface without curing and losing the flow promoting advantages of the thermosetting resin.

The bonding process and special adhesive are particularly adapted for cement shoe toe lasting processes and the invention will be described more fully for this use but it will be understood that the process and adhesive are useful in other relations.

Reference is made to the drawings forming part of the disclosure of the present invention in which, FIG. 1 is an angular view of the forepart of a shoe the sides of which have been lasted and the lasting margin of the lining and toe box trimmed away and also showing the adjacent portions of a lasting machine, and showing the application of powdered adhesive at the joint between the insole and the lasting margin of the upper; and FIG. 2 is a similar view showing the wipers of the lasting machine in closed position in which they have wiped over the lasting margin and pressed it against the insole.

A new cooperative action is secured in the present invention through the use of particles in which are closely associated at least two spatially distinct components miscible in heat softened condition and cooperating on cooling to form a strong, solid solution. The components may include a tough, usually high melting point component and a more readily fusible component usually a relatively low melting point resin. This close association may involve uniform mixing of fine particles of the different components so that a particle of one component is in close proximity to a particle of a different component throughout the mass of the adhesive. Alternatively, the more readily fusible component may be adhered to or coated on particles of the high melting point component, provided that at least portions of the more readily fusible component remain in spaces distinct from the high melting point component. Coatings may be deposited from solutions in volatile liquids in which the high melting component is not readily soluble. Close association of the component insures that when the particles are brought to application temperature, ordinarily through introduction into a stream of hot gas, the low melting component in fluid condition is free to wet and enter a surface against which the stream is directed and is also available to soften and aid in coalescence of the particles of the high melting component.

Effective cooperation between separate particles of the different components depends to a considerable extent on the use of particles not substantially larger than that size which will pass a 60 mesh standard sieve and preferably particles capable of passing a 175 mesh sieve. It has been found that particles above this size range may not be sufficiently softened for effective bonding and co-action using temperatures of the heated gas stream normally permissible.

Tough high melting point components useful in the present adhesive method may be the linear resinous polyesters or co-polyesters of terephthalic acid and isophthalic acid with glycols of the series $HO(CH_2)_nOH$ (where "$n$" is an integer greater than 1 but not exceeding 10), as disclosed in the co-pending application of Crowell referred to above. Other heat softenable resins, such as the polyamides, polystyrene and other vinyl polymer and copolymer resins e.g. polyvinyl chloride may be used. These resins are relied on as the primary strength-giving component of the adhesive and in general should be of high molecular weight and of a melting point sufficiently high to withstand the temperatures to which the bond will be subjected.

The low melting point material is preferably a thermosetting resin such as a phenolaldehyde condensate, but other thermosetting resins—for example, urea aldehyde, melamine aldehyde and epoxide resins may be used with addition of curing agent or catalyst where necessary. These thermosetting resins are preferred because when heated rapidly, as in the hot gas stream, they soften readily to a fluid condition which can wet and/or penetrate the surface to be bonded, aid in catching and holding the high melting component on that surface, and soften and aid in coalescence of the high melting point component; but on curing these resins do not adversely affect the high melting point component but may improve its reat resistance. Resins with partial water solubility appear to improve bonding to wet leather. Where heat resistance is not a factor, a thermoplastic low melting point component may be used. For example, it has been found that particles of thermoplastic material or synthetic resins, for example, the gasoline insoluble residue from the distillation of pine tar (Vinsol) or low molecular weight polystyrenes and so on may be combined with particles of the high melting component with proper attention to using combinations which are at least partially miscible in heat softened condition. It is also possible to use more than one low melting point component. A useful combination of low melting point resins is a mixture of particles of an acid catalyzed resorcinol formaldehyde resin in which less than an equivalent amount of formaldehyde has been condensed with the resorcinol, with an alkaline catalyzed phenolformaldehyde resin in which the formaldehyde is combined in greater than the theoretical amount. The acid catalyzed resin is cured when heated in contact with the alkaline catalyzed resin so that it is unnecessary to incorporate formaldehyde or further catalyst with either of the two resins.

The relative proportions of high melting and low melting components may vary considerably depending upon the particular bond to be formed. In general, for adhesive compositions useful in toe lasting there may be used from 5% to 20%, by weight, of the relatively low melting component with from 95% to 80%, by weight, of tough high melting component.

In the bonding method, the powdered adhesive comprising the two different components is heated rapidly and formed as an adhesive layer on a surface to be bonded and promptly thereafter, while the adhesive is still hot and capable of establishing a bond, a second surface is pressed down on the hot adhesive.

In carrying out the bonding process for the lasting portion of shoe uppers, for example, toe portions, using the new powdered adhesives, a shoe upper 10 and insole 12 are assembled on a last, pulled over, and the side, shank and rear portions lasted in any convenient manner, for example, with staples 14, along the sides of the shoe. The toe portion of the shoe 10 is usually subjected to a toe steaming operation to increase the moisture content and soften the shoe upper material, such as leather to facilitate lasting. The partially lasted shoe 10 is fitted to the bed lasting machine jack (not shown), the lasting wipers 16 for the toe end are adjusted and the operator pulls out any tacks which might interfere with the lasting. The toe portion is then subjected to preliminary lasting and wiping actions to take out stretch of the upper material and pull the upper 10 snugly to the toe of the last. The margin 18 of the upper 10 is opened out and surplus lining and box toe material are trimmed away, for example by means of a hand knife.

Any convenient device may be used to apply the powdered adhesive, a preferred device 20 being that illustrated generally in FIG. 1 in which a gas such as air supplied under pressure to inlet tube 21 is forced through a hot tube 22 and emerges as a stream of gas at temperature sufficient to raise the adhesive to bond forming temperature. Powdered adhesive is carried from a storage container 24 by a low velocity stream of air through a tube 26 and injected into the hot gas stream where the particles are entrained in and carried to the surface to be adhered by the gas stream. As shown in the figure, these elements may be mounted on a suitable handle 28 provided with a trigger device 30 for initiating or terminating operation.

The stream of hot air with the entrained particles of adhesive is directed at the joint between the lasting margin 18 of the shoe and the insole 12 and progressively deposits a layer 32 of heat softened particles along the insole 12. After each successive particle of the layer 32 is deposited, it is further softened by heated air from the tube 22 in movement from the device 20 to form the next portions of the layer. Promptly after deposition of the layer 32 of the adhesive and while the adhesive is in heat softened condition, the lasting wipers 16 are actuated to wipe the margin 18 of the upper 10 over on to the insole 12.

The following examples are given as possible assistance in understanding the invention, but it is to be understood that the invention is not restricted to the materials, proportions or conditions of the examples.

*Example 1.*—A thermoplastic linear copolyester of 1.4 butane diol with isophthalic and terephthalic acid radicals in the ratio of .175 mols of isophthalic to .825 mols of terephthalic acid, having a melting point of about 194° C. was reduced to a powder sufficiently fine to pass a 200 mesh standard sieve. A novolak type resorcinol formaldehyde resin having a softening point B. and R. of 103° to 112° C. was likewise ground to a fineness capable of passing a 200 mesh standard sieve. 15 parts of the resorcinol resin particles were blended uniformly with 85 parts by weight of particles of the copolyester resin and the mixture was introduced into the powder storage compartment of an applying device 29 such as shown in FIG. 1. This device was adjusted to supply a stream of hot air at a temperature of 750° F. from the tube 22 and to inject powder from the powder storage 24 through the tube 26 into the hot gas stream. A partially lasted shoe 10 was fitted to the bed lasting machine jack and subjected to preliminary lasting and wiping actions to take out stretch of the upper material and pull the upper snugly to the toe of the last. The lasting margin 18 of the upper 10 was opened out and surplus lining and box toe materials were trimmed away. The applicator device 20 was then operated to direct a stream of hot air including entrained particles of the mixed resinous materials at the joint of the lasting margin 18 of the shoe 10 and insole 12. The device 20 was manipulated so that the stream of air was moved in the direction of the powdered adhesive supply tube 26. By this procedure the entrained powdered adhesive was softened before reaching the insole 12 to a condition at which it adhered to the insole 12, as a layer 32, and then was brought to a condition in which the adhesive layer 32 was more fully softened and rendered fluid by further portions of heated gas passing over the deposited adhesive. Promptly after the adhesive had been deposited over the portion of the insole on which the lasting margin 18 of the upper 10 was to be secured, the lasting wipers 16 were actuated to wipe the margin 18 of the upper 10 over on to the insole 12. On release of the lasting wipers 16, it was found that a superior job of lasting had been accomplished in which the lasting margins were strongly and smoothly held against the insole.

*Example 2.*—85 parts of powdered copolyester resin and 10 parts of powdered resorcinol formaldehyde resin, described in Example 1, were combined with 5 parts by weight of a heat hardenable alkali catalyzed resinous condensation product of para tertiary butyl phenol with an excess over the equivalent amount of formaldehyde, this condensate having been ground to a fineness capable of passing a 200 mesh standard sieve. This resinous condensation product had a softening point (B. and R.) of 70° to 75° C. This powder mixture was used in the toe lasting procedure described in Example 1 and was found to give an excellent adhesive lasting. Upon examination of the material deposited, it was found that the mass had been cured by interaction of the resorcinol formaldehyde resin and para tertiary butyl formaldehyde resin to a condition at which it was no longer heat fusible.

*Example 3.*—100 parts by weight of the powder copolyester resin, described in Example 1, were combined with 150 parts by weight of a 1% solution in alcohol of the heat hardening phenolic resin used according to Example 2, and the mixture was spread in a layer and allowed to dry with stirring to deposit a coating of the heat hardening resin on the surface of the copolyester resin particles. The particles were rescreened through a 100 mesh standard sieve and were used in a toe lasting operation following the procedure set forth in Example 1. The resulting shoe was found to be smoothly lasted in place and the lasting bond was strongly resistant to separation.

Having thus described my invention, what I claim as new and desire to secure by Letters Patent of the United States is:

1. A method for bonding surfaces together comprising the steps of forming on a surface a layer of heat softened particles of at least two different heat fusible materials in spatially distinct relation, said materials being at least partially miscible with each other in heat softened condition for cooperation to form on cooling a strong, solid solution, one of said materials having a relatively high softening point and another of said materials having a relatively low softening point, said materials being evenly distributed in said layer in initially distinct but contacting spaces, heating said particles to soften the low softening point component to fluid condition in which the fluid component wets said surface and improves coalescence of the high softening point component particles and said relatively low softening point material at least partially dissolving and further softening portions of said relatively high softening point material with which it is in contact in said layer, pressing a second surface against said layer to force the heat softened material into intimate engagement with both of said surfaces and solidifying the material.

2. A method for bonding comprising the steps of directing against a surface to be bonded a stream of heated gas and entrained heat softenable particles of at least two different heat fusible materials in spatially distinct relation, said materials being at least partially miscible with each other in heat softened condition, one of said materials having a relatively high softening point and another of said materials having a relatively low softening point, softening said particles by heat from said gas stream, depositing heat softened particles from said stream of gas as an adherent layer on said surface, said materials being evenly distributed in said layer in initially distinct but contacting spaces and supplying heat to soften said relatively low softening point material to fluid condition, said low softening point material at least partially dissolving and further softening portions of said relatively high softening point material with which it is in contact in said layer, pressing a second surface against said layer to force the heat softened material into intimate engagement with both of said surfaces and solidifying the material.

3. A method for bonding together surfaces comprising the steps of directing against a surface to be bonded a stream of heated gas and entrained heat softenable particles of at least two different heat fusible materials which are at least partially miscible with each other in heat softened condition, one of said materials having a relatively high softening point and another of said materials having a relatively low softening point and being convertible by heat to a cured condition, softening said particles by heat from said gas stream, depositing heat softened particles from said stream of gas as an adherent layer on said surface, said materials being evenly distributed in said layer in initially distinct but contacting spaces and supplying heat to soften said relatively low softening point material to fluid condition, said low softening point material at least partially dissolving and further softening portions of said relatively high softening point material with which it is in contact in said layer, pressing a second surface against said layer to force the heat softened material into intimate engagement with both of said surfaces and solidifying the material.

4. A method for bonding comprising the steps of directing against a surface to be bonded a stream of heated gas and entrained heat softenable particles, said particles being a mixture of particles having a relatively high softening point and particles having a relatively low softening point, softening said particles by heat from said gas stream, depositing heat softened particles from said stream of gas as an adherent layer on said surface, said materials being evenly distributed in said layer in initially distinct but contacting spaces and supplying heat to said relatively low softening point material to soften it to fluid condition, said fluid at least partially dissolving and further softening portions of said relatively high softening point material with which it is in contact in said layer, pressing a second surface against said layer to force the heat softened material into intimate engagement with both of said surfaces and solidifying the material.

5. A method for bonding comprising the steps of directing against a surface to be bonded a stream of heated gas and entrained heat softenable particles, said particles comprising particles of a material having a relatively high softening point and an adherent deposit on said particles of a material having a relatively low softening point, said materials being in spatially distinct relation, softening said particles from heat from said gas stream, depositing heat softened particles from said stream of gas as an adherent layer on said surface, supplying heat to said relatively low softening point material to fluid condition, said low softening point material at least partially dissolving and further softening portions of said relatively high softening point material with which it is in contact in said layer, pressing a second surface against said layer to force the heat softened material into intimate engagement with both of said surfaces and solidifying the material.

6. A method for bonding surfaces together comprising the steps of directing against a first surface a stream of heated gas and entrained heat softenable particles of at least two different heat fusible materials in spatially distinct relation, said materials being at least partially miscible in heat softened condition, one of said materials having a relatively high softening point and another of said materials having a relatively low softening point, said low softening point material being disposed as a coating on the particles of material having a high softening point, warming said particles by heat from said gas stream to a temperature at which the low softening point material is in substantially liquid condition and the high softening point material is in heat softened condition, disposing said warmed particles from said stream of gas as an adherent layer on said surface with said substantially liquid low softening point material in wetting engagement with said surface and at least partially dissolving and further softening adjacent portions of said high softening point material, pressing a second surface against the deposited material to force the material into intimate engagement with both of the surfaces, and solidifying the material.

7. A method for bonding surfaces together comprising the steps of directing against a first surface a stream of heated gas and entrained heat softenable particles of at least two different heat fusible resins in spatially distinct relation, said resins being at least partially miscible in heat softened condition, one of said resins having a relatively high softening point and another of said resins having a relatively low softening point and being curable by heat, said low softening point resin being disposed as a coating on the particles of resin having a high softening point, warming said particles by heat from said gas stream to a temperature at which the low softening point resin is in substantially liquid condition and the high softening point resin is in heat softened condition, disposing said warmed particles from said stream of gas as an adherent layer on said surface with said substantially liquid low softening point resin in wetting engagement with said surface and at least partially dissolving and further softening adjacent portions of said high softening point resin, pressing a second surface against the deposited resin to force the resin into intimate engagement with both of the surfaces, and solidifying the material.

8. A method for bonding surfaces together comprising the steps of directing against a first surface a stream of heated gas and entrained particles of at least two different heat fusible resins, said resinous particles comprising a mixture of from 80% to 95% by weight of particles of a high molecular weight linear polyester of terephthalic acid and 1,4 butane diol, and from 20% to 5% by weight based on the weight of said mixture of particles of a resinous condensate of a phenol and an aldehyde, warming said particles by the heated gas to a temperature at which the phenol aldehyde resin is in substantially liquid condition and the polyester resin is in heat softened condition, depositing said warmed particles from said stream of gas as an adherent layer on said surface, said particles of different resins being evenly distributed in said layer in initially distinct contacting spaces and said substantially liquid resin at least partially dissolving and further softening the surfaces of said particles of polyester resin with which it is in contact in said layer, pressing a second surface against the deposited resinous material to force the material into intimate engagement with both of the surfaces and solidifying the material.

9. The method of lasting portions of a shoe upper which comprises depositing adjacent the edge of the insole of a partially lasted shoe a layer of heat softened particles of at least two different heat fusible materials, one of said materials having a relatively high softening point and another of said materials having a relatively low softening point, said materials being evenly distributed in said layer in physically distinct but closely adjacent spaces and being at least partially miscible in heat softened condition for cooperation to form on cooling a strong, solid solution, heating said particles to soften said relatively low softening point component to fluid condition in which said low melting component wets said component and improves coalescence of said relatively high softening point component, promptly wiping the lasting margin of the shoe upper inwardly over and pressing said lasting margin against said layer and the bottom of the shoe to force the material of the layer into intimate engagement with said lasting margin and the bottom of the shoe and solidifying the material to hold said lasting margin strongly to the bottom of the shoe.

10. A method of lasting portions of a shoe which comprises directing against the area adjacent the edge of the insole of a partially lasted shoe a stream of heated gas and entrained heat softenable particles of at least two different heat fusible resins, said resinous particles comprising a mixture of from 80% to 95% by weight of particles of a high molecular weight linear polyester of terephthalic acid and 1,4 butane diol, and from 20% to 5% by weight based on the weight of said mixture of particles of a resinous condensate of a phenol and an aldehyde, said polyester and said condensate being at least partially miscible in heat softened condition, warming said particles by the heated gas to a temperature at which the phenol aldehyde resin is in substantially liquid condition and the polyester resin is in heat softened condition, depositing said warmed particles from said stream of gas as an adherent layer on said insole, said particles of different resins being evenly distributed in said layer in initially distinct contacting spaces and said substantially liquid resin at least partially dissolving and further softening the surfaces of said particles of polyester resin with which it is in contact in said layer, wiping the lasting margin of the shoe upper inwardly over and pressing said lasting margin against the bottom of the shoe to force the deposited resinous material into intimate engagement with said lasting margin and the bottom of the shoe and solidifying said resinous material to hold said lasting margin strongly to the bottom of the shoe.

References Cited in the file of this patent

UNITED STATES PATENTS

| | | |
|---|---|---|
| 1,990,803 | Thompson | Feb. 12, 1935 |
| 1,998,059 | Roberts | Apr. 16, 1935 |
| 2,235,887 | Kamborian | Mar. 25, 1941 |
| 2,652,382 | Davis | Sept. 15, 1953 |
| 2,652,383 | Davis | Sept. 15, 1953 |
| 2,705,522 | Kamborian | Apr. 5, 1955 |
| 2,969,555 | Kamborian | Jan. 31, 1961 |